United States Patent [19]

Kramer

[11] Patent Number: 4,847,335

[45] Date of Patent: Jul. 11, 1989

[54] ESTERS OF ALLYL-BICYCLO[2.2.1]HEPT-5-ENE-2-CARBOXYLIC ACID AND POLYMERS THEREOF

[75] Inventor: Andreas Kramer, Düdingen, Switzerland

[73] Assignee: Ciba-Geigy Corporation, Ardsley, N.Y.

[21] Appl. No.: 79,979

[22] Filed: Jul. 31, 1987

[30] Foreign Application Priority Data

Aug. 11, 1986 [CH] Switzerland .................... 3214/86

[51] Int. Cl.$^4$ .................... C08G 8/30; C07C 69/74
[52] U.S. Cl. .................... 525/502; 525/508; 560/120; 560/128
[58] Field of Search .................... 560/1, 120, 128; 526/321; 525/502, 508

[56] References Cited

U.S. PATENT DOCUMENTS

| | | | |
|---|---|---|---|
| 3,105,839 | 10/1963 | Renner | 260/346.3 |
| 3,287,395 | 11/1966 | Chang | 260/468 |
| 3,658,669 | 4/1972 | Colomb, Jr. et al. | 204/159.12 |
| 4,515,962 | 5/1985 | Renner | 548/435 |
| 4,579,916 | 1/1986 | Schmid et al. | 525/502 |
| 4,587,317 | 5/1986 | Renner | 526/259 |
| 4,667,003 | 5/1987 | Renner | 526/259 |

OTHER PUBLICATIONS

A. G. Gonzalez et al., Tetrahedron Letters, 25, 2697 (1984).

Primary Examiner—Theodore E. Pertilla
Attorney, Agent, or Firm—Luther A. R. Hall

[57] ABSTRACT

Compounds of the formula I

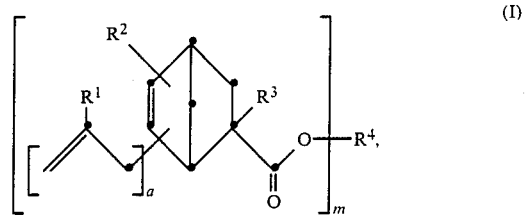

in which a is 1, 2 or 3, m is an integer from 2 to 20, $R^1$, $R^2$ and $R^3$ independently of one another are hydrogen or methyl and $R^4$ is an m-valent radical of a polyol after removal of m hydroxyl groups, can be thermally reacted to give crosslinked polymers having outstanding physical properties.

The polymers are suitable especially as casting resins, matrix resins, adhesives, encapsulating resins, insulating materials for electronics and electrical engineering and in surface protection.

10 Claims, No Drawings

ESTERS OF ALLYL-BICYCLO[2.2.1]HEPT-5-ENE-2-CARBOXYLIC ACID AND POLYMERS THEREOF

The invention relates to bicyclo[2.2.1]hept-5-ene-2-carboxylic acid esters, which are substituted by allyl or methallyl and may be substituted by methyl, with 2- to 20-hydric polyols, to their preparation, to crosslinked polymers obtainable from them and to the use of these polymers as casting resins, matrix resins, adhesives, encapsulating resins, insulating materials for electronics and electrical engineering, and in surface protection.

Derivatives of allyl-bicyclo[2.2.1]hept-5-ene-2,3-dicarboxylic acid are known. Thus, EP-A 105,024 describes imides of this dicarboxylic acid and the polymers which can be obtained by thermal polymerization of the monomers. The polymeric products are suitable, for example, as matrix resins for composite materials or as insulating materials.

Derivatives of allyl-bicyclo[2.2.1]hept-5-ene-2-carboxylic acid have been described by A. G. Gonzalez et al. in Tetrahedron Lett. 25(25), 2697–2700 (1984). In addition to the allyl and carboxyl functional groups, these compounds also contain a hydroxyl group or a chlorine atom in the 7-position. The paper relates to the synthesis of stereospecifically 7,7-difunctionalized derivatives of the bicyclo[2.2.1]heptene system.

In U.S. Pat. No. 3,658,669, various derivatives, inter alia also esters, of substituted carboxylic acids containing the bicyclo[2.2.1]heptene radical are described.

U.S. Pat. No. 3,287,395 describes Diels-Alder reaction products of alkenyl-substituted cyclopentadienes with α,β-unsaturated carboxylic acids, in particular dicarboxylic acids, and the use of these products, together with other unsaturated dicarboxylic acids such as maleic acid and with diols for the preparation of unsaturated polyesters.

The allyl- or methallyl-substituted bicyclo[2.2.1]-hept-5-ene-2-carboxylic acid esters according to the invention are valuable starting materials for polymers having outstanding properties. They are defined by formula I which follows:

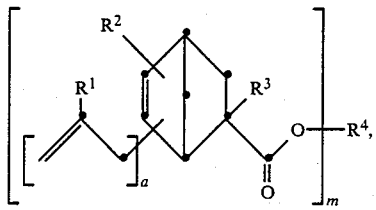

(I)

in which $R^1$, $R^2$ and $R^3$ independently of one another are hydrogen or methyl, a is 1, 2 or 3, m is an integer from 2 to 20 and $R^4$ is an m-valent radical of an aliphatic polyol or a mononuclear or polynuclear cycloaliphatic or aromatic polyol or of a novolak after removal of m hydroxyl groups, or is an alkylene glycol or polyalkylene glycol radical after removal of 2 hydroxyl groups, no more than one C—O bond being present per carbon atom in the radical $R^4$.

Preferably, a is the number 1 and $R^1$, $R^2$ and $R^3$ are hydrogen.

$R^4$ is preferably a radical of an aromatic polyol or of a novolak.

Those compounds of the formula I are also preferred in which m is an integer from 2 to 5 and $R^4$ is an m-valent $C_2$–$C_{20}$-aliphatic, a mononuclear or polynuclear $C_5$–$C_{20}$-cycloaliphatic or a $C_6$–$C_{20}$-aromatic or araliphatic radical, a radical of the formula —CH$_2$CH$_2$(OCH$_2$CH$_2$)$_n$ or of the formula —CH$_2$CH$_2$CH$_2$(OCH$_2$CH$_2$CH$_2$)$_n$ with n being an integer from 1 to 10, preferably 1 to 5, or is an m-valent radical of the formula II

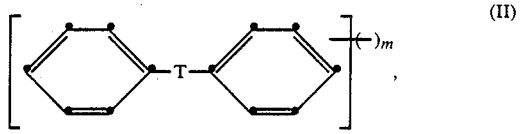

(II)

in which T is methylene, isopropylidene, CO, O, S or SO$_2$.

The radicals $R^4$ can in addition also contain free, unesterified hydroxyl substituents, but there may at most be one C—O bond or hydroxyl group per carbon atom in the radical $R^4$. However, radicals $R^4$ which are free of hydroxyl groups are preferred.

An m-valent $C_2$–$C_{20}$-aliphatic radical $R^4$ can be straight-chain or branched. A mononuclear or polynuclear $C_5$–$C_{20}$-cycloaliphatic radical $R^4$ can represent monocyclic, bicyclic or even polycyclic systems which, if desired, can be substituted by up to two $C_1$–$C_5$-alkyl groups. The hydroxyl groups of the polyol can also be bonded to the cycloaliphatic radical via $C_1$–$C_5$-alkylene groups, for example methylene.

Examples of suitable aliphatic radicals $R^4$ are ethylene, 1,2- and 1,3-propylene, butylene, penta- and hexamethylene, heptylene, octylene, decylene, dodecylene, hexadecylene, neopentylene and radicals of glycerol, of 1,1,1-tris-(hydroxymethyl)-propane and of pentaerythritol [2,2-bis-(hydroxymethyl)-1,3-propanediol].

Examples of suitable mononuclear or polynuclear cycloaliphatic radicals $R^4$ are cyclopentylene, cyclohexylene, cycloheptylene, cyclooctylene, bis-(cyclohexylene)methane, 2,2-bis-(cyclohexylene)-propane, decalinylene, bicyclo[2.2.1]heptylene, bicyclo[2.2.2]octylene, tricyclo[5.2.1.0$^{2,6}$]decylene and the corresponding $C_1$–$C_5$-alkyl-substituted derivatives, or radicals of polyols, in which the hydroxyl groups are bonded to the cycloaliphatic radical via $C_1$–$C_5$-alkylene groups, after removal of the hydroxyl groups. In the case of a mononuclear or polynuclear $C_6$–$C_{20}$-aromatic radical $R^4$, the polynuclear systems can also contain fused rings.

Those compounds of the formula I are also preferred in which $R^4$ is an m-valent radical of a phenol or cresol novolak after removal of m hydroxyl groups.

Compounds according to the invention, of the formula I, also comprise structures in which the radical $R^4$ is derived from polyols or novolaks which contain halogen atoms, in particular chlorine and bromine.

Examples of suitable aromatic radicals $R_4$ are 1,3- or 1,4-phenylene or naphthylene and radicals derived from bisphenol A or bisphenol F.

Those compounds of the formula I are particularly preferred in which m is the number 2 and $R^4$ is a —$C_pH_{2p}$-group with p being an integer from 2 to 15, a $C_5$–$C_{12}$-cycloaliphatic radical, a $C_6$–$C_{12}$-aromatic radical or a radical of the formula II.

Those compounds of the formula I are very particularly preferred in which the radical $R^4$ is derived from a polyol selected from the group comprising $HO(CH_2)_6OH$, $HO(CH_2)_{12}OH$,

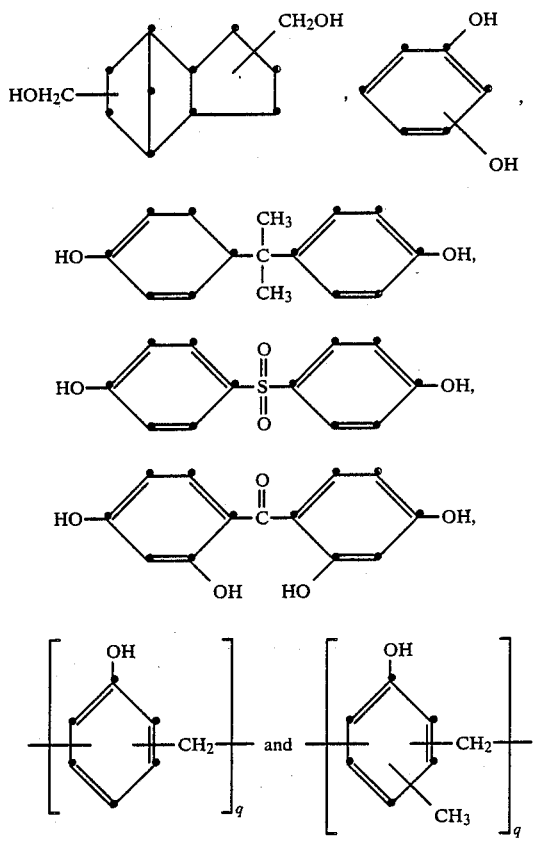

q being an integer from 3 to 20.

That compound of the formula I is most preferred in which a is the number 1, m is the number 2, $R^1$, $R^2$ and $R^3$ are hydrogen and $R^4$ is

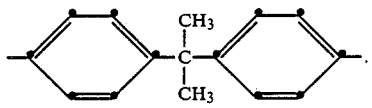

The compounds according to the invention, of the formula I, can be prepared in a manner known per se, for example by reacting an acid chloride of the formula III

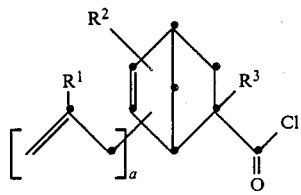 (III)

with a polyol of the formula IV $R^4(OH)_m$ (IV)

in the presence of a quantity, at least equivalent to the acid chloride, of a tertiary amine or an alkali metal carbonate, the radicals $R^1$, $R^2$, $R^3$ and $R^4$ as well as a and m being as defined under the formula I. The reaction can be carried out without a solvent or preferably in the presence of an inert aprotic solvent, for example chloroform, methylene chloride, diethyl ether, dioxane, toluene, xylene or hexane. Suitable bases for neutralizing the hydrogen chloride released are tertiary amines, for example triethylamine or pyridine, or alkali metal carbonates, for example sodium or potassium carbonate. The reaction temperature can be between 0 and about 150° C. Preferably, the esters according to the invention are prepared in such a way that the reactants are brought together at room temperature or with cooling, and the reaction mixture is then stirred while raising the temperature to about 50° to 100° C. Preferably, the reaction is carried out with the use of stoichiometric quantities of the reactants, so that one mol of the acid chloride III is used per hydroxy equivalent of the polyol IV; however, an excess of up to 30% of one of the reactants, especially the acid chloride, can also be used.

The acid chlorides of the formula III can be prepared analogously to the process described in U.S. Pat. No. 3,105,839, by reacting sodium cyclopentadienide or sodium methylcyclopentadienide with an allyl or methallyl halide, followed by a Diels-Alder reaction with acryloyl or methacryloyl chloride.

Polyols of the formula IV are known or can be prepared in a manner known per se.

The compounds according to the invention, of the formula I, are liquid or low-melting solids and are readily soluble in organic solvents. They can be converted thermally into insoluble crosslinked polymers having valuable physical properties. No volatile components are formed in the polymerization, and this is an advantage in many applications, for example the preparation of coating films or in the use as matrix resins.

The invention therefore also relates to polymers which are obtainable by heating a compound of the formula I or a mixture of such compounds to a temperature between 150° and 300° C., in particular between 180° and 250° C., for a period of 5 to 30 hours, preferably 10 to 25 hours.

A polymer having particularly advantageous properties is obtained by heating a compound of the formula I, in which a is the number 1, m is the number 2, $R^1$, $R^2$ and $R^3$ are hydrogen and $R^4$ is

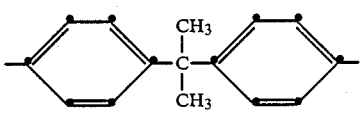

to a temperature between 180° and 250° C. for a period of 10 to 25 hours.

The compounds according to the invention can be used and polymerized directly, or they can first be dissolved in an organic solvent such as toluene, xylene, methyl ethyl ketone, ethylene glycol dialkyl ethers having 1–4 C atoms in the alkyl groups or a similar solvent conventional in the coating industry. Such solutions can be used as impregnating agents or coating agents or can also be despatched as such to the user. Preferably, the polymerization of the esters according to the invention is carried out directly without use of solvents.

Of course, inert and stable substances, such as fillers, pigments, dyes and other additives, can be added to the compounds of the formula I, before they are polymerized to give crosslinked structures.

The polymeric products can be used in many ways, for example as adhesives and also in surface protection and as encapsulating resins and insulating materials for electronics and electrical engineering, and especially as casting resins or matrix resins for fibre-reinforced composites. The low melt viscosity allows impregnation of the fibres from the melt. Particularly suitable reinforcing agents are glassfibres, carbon fibres and polyamide fibres. The invention also relates to the use of the polymeric products for the abovementioned purposes.

PREPARATION EXAMPLES

Example 1

Allylbicyclo[2.2.1]hept-5-ene-2-carbonyl chloride

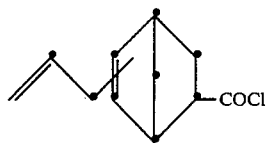

A solution of 400 g of NaOH in 800 ml of H$^2$O and 16 g of benzyltriethylammonium chloride in 32 ml of ethanol is warmed to 30°–35° C., and 264 g of cyclopentadiene are added with stirring within 15 minutes. 336 g of allyl chloride are added dropwise to the deep-red clear emulsion within 45 minutes. A reaction starts immediately, which manifests itself by evolution of heat and precipitation of sodium chloride. The internal temperature is maintained between 50° and 55° C. by means of an ice bath. After the dropwise addition of the allyl chloride, the mixture is stirred for a further 30 minutes at 50° C. The reaction solution is cooled down, and 200 ml of water are added. The salt which has precipitated goes thus into solution. The aqueous phase is separated off, and the organic phase is washed twice with saturated NaCl solution and filtered over sodium sulfate. The unconverted cyclopentadiene and allyl chloride are distilled off at room temperature and under a reduced pressure. This purification operation is stopped as soon as an absolute pressure of 33 mbar is reached. Analysis of the residue by chromatography shows that, in addition to allylcyclopentadiene (about 75%), di- and tri-allylcyclopentadiene, dicyclopentadiene and diallyl-dicyclopentadiene are also present as by-products. 360 g of crude allylcyclopentadiene are taken up in 400 ml of methylene chloride. 252 g of acryloyl chloride are added to this clear red-brown solution within one hour at 20°–25° C. with ice cooling and the mixture is then stirred for 2 hours at 20° C. The reaction solution is concentrated in a rotary evaporator and the residue is distilled under an absolute pressure of 26 mbar. 377 g of allylbicyclo[2.2.1]hept-5-ene-2-carbonyl chloride pass over between 112° C. and 120° C., which corresponds to a yield of 68% of theory. The yellow liquid can be stored under nitrogen at 0° C. for a prolonged period. For characterization, the acid chloride is converted into the corresponding methyl ester.

Example 2

Hexamethylene bis-(allyl-bicyclo[2.2.1]hept-5-ene-2-carboxylate)

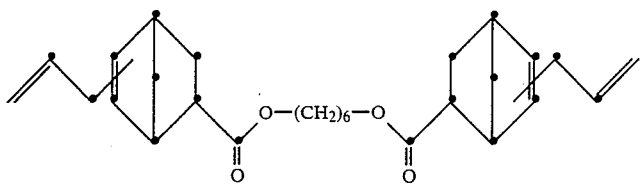

58.9 g of allylbicyclo[2.2.1]hept-5-ene-2-carbonyl chloride (prepared according to Example 1) are added dropwise at 20° C. within 40 minutes to a solution of 15.1 g of hexanediol in 150 ml of pyridine. The mixture is then stirred for a further hour at 80° C. The reaction solution is cooled down, poured with stirring onto 1,000 ml of 2N HCl and extracted with twice 250 ml of methylene chloride. The combined organic phases are washed with 1N HCl, aqueous soda solution and saturated sodium chloride solution, dried over sodium sulfate and filtered, and the solvent is distilled off at 60° C. in a rotary evaporator. The residue is dried for 2 hours at 140° C. in vacuo. This gives 55.7 g (99% of theory) of a red-brown liquid resin with $\eta_{25}$=109 mPas. By gel permeation chromatography (THF) the molecular weight is found to be 449 ($\overline{M}_n$) or 455 ($\overline{M}_w$).

| Analysis: | % C | % H |
|---|---|---|
| Calculated for C$_{28}$H$_{38}$O$_4$ | 76.68 | 8.73 |
| Found | 77.32 | 8.77 |

Examples 3 to 10.

Analogously to Example 2, various diols are reacted with allylbicyclo[2.2.1]hept-5-ene-2-carbonyl chloride to give the corresponding diesters. The results are summarized in Table 1.

TABLE 1

| Example | Diol | Yield in % | Viscosity in mPas | Softening Point in °C. | GPC* in THF $\overline{M}_n$ | $\overline{M}_w$ | Elemental analysis (calculated values) % C | % H |
|---|---|---|---|---|---|---|---|---|
| 3 | HO(CH$_2$)$_{12}$OH | 82 | 145(25° C.) | — | 583 | 594 | 78.09(78.12) | 9.48(9.64) |

TABLE 1-continued

| Example | Diol | Yield in % | Viscosity in mPas | Softening Point in °C. | GPC* in THF $\overline{M}_n$ | $\overline{M}_w$ | Elemental analysis (calculated values) % C | % H |
|---|---|---|---|---|---|---|---|---|
| 4 | 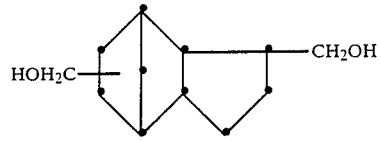 | 97 | 478(40° C.) | — | 450 | 455 | 79.07(79.03) | 8.44(8.58) |
| 5 | 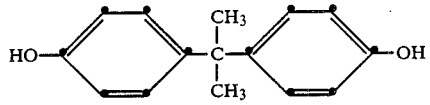 | 81 | 237(80° C.) | — | 540 | 548 | 80.60(80.99) | 7.34(7.35) |
| 6 | 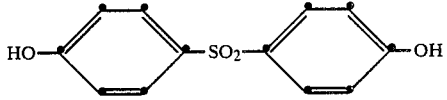 | 83 | 548(80° C.) | — | 641 | 667 | 71.66(71.56) | 6.06(6.01) |
| 7 | 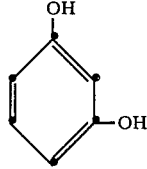 | 91 | 805(25° C.) | — | 435 | 448 | 77.74(78.11) | 6.82(7.02) |
| 8 | 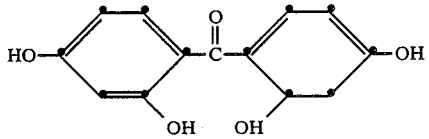 | 82 | 166(120° C.) | — | 801 | 812 | 76.98(77.27) | 6.44(6.48) |
| 9 | Phenol novolak 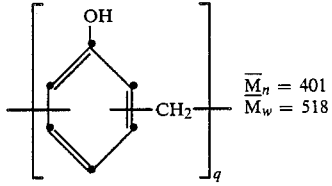 $\overline{M}_n = 401$ $\overline{M}_w = 518$ | 87 | 1070(80° C.) | — | 818 | 1351 | 80.37(81.17) | 6.80(6.81) |
| 10 | Kresol novolak 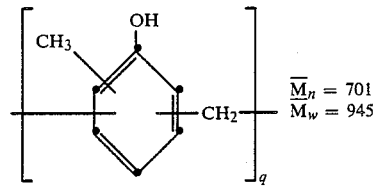 $\overline{M}_n = 701$ $\overline{M}_w = 945$ | 97 | — | 60 | 1221 | 1850 | 80.91(81.39) | 7.13(7.19) |

*Gel permeation chromatography

Example 11

Bisphenol A bis-(methallyl-methyl-bicyclo[2.2.1]hept-5-ene-2-carboxylate)

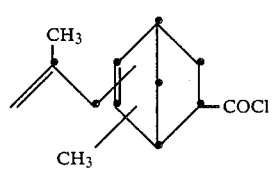

(a)

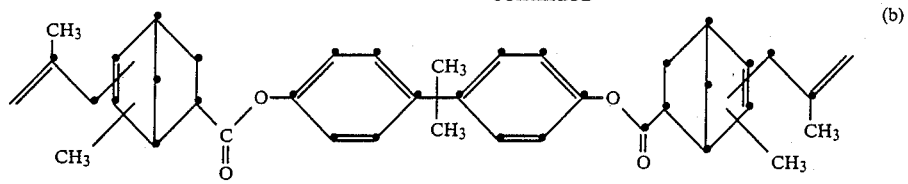

(a) Replacing cyclopentadiene and allyl chloride by methylcyclopentadiene and methallyl chloride and proceeding in other respects in the same way as described in Example 1, methallyl-methyl-bicyclo[2.2.1]hept-5-ene-2-carbonyl chloride is obtained.

(b) 175 g of methallyl-methyl-bicyclo[2.2.1]hept-5-ene-2-carbonyl chloride are added dropwise at 20° C. within 30 minutes to a solution of 87 g of bisphenol A in 300 ml of pyridine. The mixture is then stirred for a further hour at 80° C. and then worked up as described in Example 2. This gives 205 g (89% of theory) of a brown, liquid resin with $\eta_{120} = 640$ mPas. By gel permeation chromatography (THF), the molecular weight is found to be 616 ($\overline{M}_n$) or 656 ($\overline{M}_w$).

| Analysis: | % C | % H |
|---|---|---|
| Calculated for $C_{41}H_{48}O_4$ | 81.42 | 8.00 |
| Found | 80.65 | 8.04 |

Example 1, to give allylbicyclo[2.2.1]hept-5-ene-2-methyl-2-carbonyl chloride.

(b) 211 g of allyl-bicyclo[2.2.1]hept-5-ene-2-methyl-2-carbonyl chloride are added dropwise at 20° C. within 40 minutes to a solution of 114 g of bisphenol A in 350 ml of pyridine. The mixture is then stirred for a further hour at 80° C. and then worked up as described in Example 2. This gives 250 g (87% of theory) of a viscous, red-brown resin with $\eta_{120°} = 380$ mPas. By gel permeation chromatography (THF) the molecular weight is found to be 675 ($\overline{M}_n$) or 1,183 ($\overline{M}_w$).

| Analysis: | % C | % H |
|---|---|---|
| Calculated for $C_{39}H_{44}O_4$ | 81.21 | 7.69 |
| Found | 80.51 | 7.55 |

Example 13
Bisphenol A bis-(diallyl-bicyclo[2.2.1]hept-5-ene-2-carboxylate)

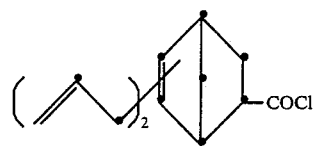

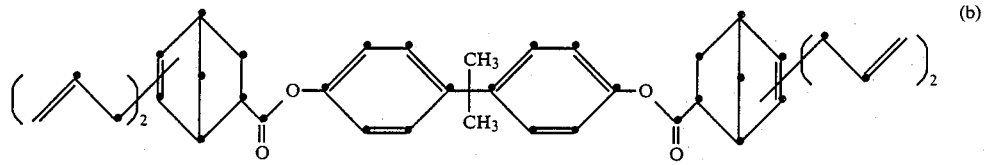

Example 12
Bisphenol A bis-(allyl-bicyclo[2.2.1]hept-5-ene-2-methyl-2-carboxylate)

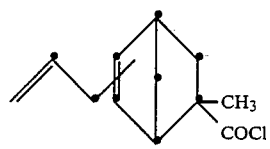

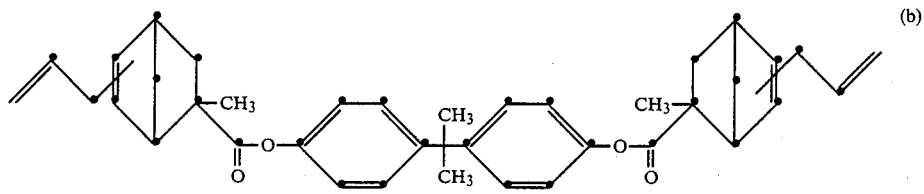

(a) The allylcyclopentadiene prepared according to Example 1 is reacted with methacryloyl chloride instead of acryloyl chloride in the manner described in (a) Under the same reaction conditions as in Example 1, 132 g of cyclopentadiene and 321 g of allyl chloride are added dropwise to 300 g of NaOH in 600 ml of $H_2O$ and 12 g of benzyltriethylammonium chloride (dissolved in 24 ml of ethanol). After the dropwise addition, the mixture is stirred for 2 hours at 65° C. The salt formed is dissolved by the addition of water, and the phases are separated. The organic phase is washed twice with saturated NaCl solution and filtered over sodium sulfate. Distillation of the red-brown filtrate in vacuo gives 135 g of diallylcyclopentadiene; boiling point: 70°–82° C. at 20 mm.

| Analysis (diallylcyclopentadiene): | % C | % H |
|---|---|---|
| Calculated for $C_{11}H_{14}$ | 90.35 | 9.65 |
| Found | 90.18 | 9.61 |

81 g of diallylcyclopentadiene are dissolved in 200 ml of methylene chloride. 45 g of acryloyl chloride are added dropwise to this solution at 20° C. within 30 minutes and the mixture is then stirred for 1 hour at room temperature. Distillation of the reaction product gives 84.4 g (73% of theory) of diallyl-bicyclo[2.2.1-]hept-5-ene-2-carbonyl chloride; boiling point=12- 5°–134° C. at 20 mm.

| Analysis: | % Cl |
|---|---|
| Calculated for $C_{14}H_{17}ClO$ | 14.98 |
| Found | 14.10 |

(b) 130 g of diallyl-bicyclo[2.2.1]hept-5-ene-2-carbonyl chloride are added dropwide at 20° C. within 30 minutes to a solution of 62.7 g of bisphenol A in 200 ml of pyridine. The mixture is then stirred for 1 hour at 80° C. and then worked up as described in Example 2. This gives 162 g (95% of theory) of a brown, liquid resin with $\eta_{25}=3{,}165$ mPas. By gel permeation chromatography (THF), the molecular weight is found to be 610 ($\overline{M}_n$) or 691 ($\overline{M}_w$).

| Analysis: | % C | % H |
|---|---|---|
| Calculated for $C_{43}H_{48}O_4$ | 82.13 | 7.69 |
| Found | 81.63 | 7.85 |

APPLICATION EXAMPLES

Example A

The diester prepared according to Example 2 is poured as hot, mobile resin into a test tube and cured for 3 hours at 200° C., 3 hours at 220° C. and 12 hours at 250° C. This gives a clear solid having a glass transition point of 135° C.

On adhesive bonding of aluminium sheet under the same curing conditions, the two sheets which are to be adhesively bonded overlapping by $25\times 12$ mm$^2$, a tensile shear strength according to ISO 4587 (measurement at room temperature) of 10.9 N/mm$^2$ is obtained.

Example B

The diester prepared according to Example 5 is cast as a hot, mobile resin into a steel mould of $8\times 6\times 0.4$ cm$^3$ size and cured for 4 hours at 180° C., 5 hours at 200° C. and 10 hours at 220° C. After cooling, test bars are cut from the clear, red-brown plate. The following properties are measured on the latter:

| | |
|---|---|
| Impact bending strength according to VSM 77,105 = | 9.6 kJ/m$^2$ |
| Glass transition point Tg = (measured by TA 2000)[1] | 184° C. |
| 10% Weight loss[2] = | 405° C. |
| Tensile shear strength (ISO 4587) = | 7.4 N/mm$^2$ |

[1] TA 2000 = TA 2000 differential thermal analysis system from Mettler AG, Greifensee, Switzerland.
[2] Measured by heating a sample in TA 2000; determination of the temperature at which 10% of the sample has volatilized; heating rate 4° C./minute (in air).

Example C

The diester prepared according to Example 7 is cured in a test tube for 4 hours at 180° C., 5 hours at 200° C. and 10 hours at 220° C. This gives a clear, transparent solid having a glass transition point of 231° C.

Example D

The diester prepared according to Example 10 is cast into a steel mould of $8\times 6\times 0.4$ cm$^3$ and cured as in Example B.

| | |
|---|---|
| Impact bending strength (VSM 77,105) = | 4.9 kJ/m$^2$ |
| Glass transition point Tg = | 305° C. |
| 10% Weight loss = | 438° C. |

What is claimed is:

1. A compound of the formula I

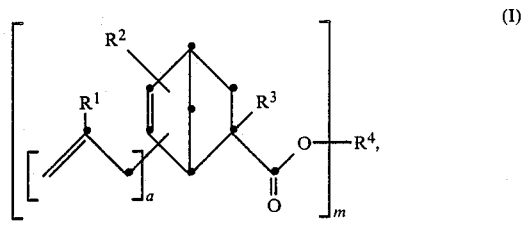

wherein $R^1$, $R^2$ and $R^3$ independently of one another are hydrogen or methyl, a is 1, 2 or 3 and m is an integer from 2 to 20, and $R^4$ is an m-valent radical of an aliphatic polyol or a mononuclear or polynuclear cycloaliphatic or aromatic polyol or of a novolak after removal of m hydroxide groups, or is an alkylene glycol or polyalkylene glycol radical after removal of 2 hydroxyl groups, no more than one C—O bond being present per carbon atom in the radical $R^4$.

2. A compound of the formula I according to claim 1, wherein $R^1$, $R^2$ and $R^3$ are hydrogen and a is 1.

3. A compound of the formula I according to claim 1, wherein $R^4$ is a radical of an aromatic polyol or of a novolak.

4. A compound of the formula I according to claim 1, wherein m is an integer from 2 to 5 and $R^4$ is an m-valent $C_2$–$C_{20}$-aliphatic, a mononuclear or polynuclear $C_5$–$C_{20}$-cycloaliphatic or a $C_6$–$C_{20}$-aromatic radical, a radical of the formula

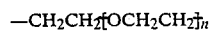

or of the formula

with n being an integer from 1 to 10, or is an m-valent radical of the formula II

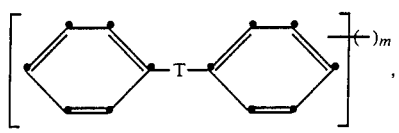 (II)

in which T is methylene, isopropylidene, CO, O, S or SO₂.

5. A compound of the formula I according to claim 1, wherein R⁴ is an m-valent radical of a phenol or cresol novolak after removal of m hydroxyl groups.

6. A compound of the formula I according to claim 4, wherein m is 2 and R⁴ is —$C_pH_{2p}$— with p being an integer from 2 to 15, a $C_5$–$C_{12}$-cycloaliphatic radical, a $C_6$–$C_{12}$-aromatic radical or a radical of the formula II.

7. A compound of the formula I according to claim 1, wherein R⁴ is derived from a polyol selected from the group consisting of $HO(CH_2)_6OH$, $HO(CH_2)_{12}OH$,

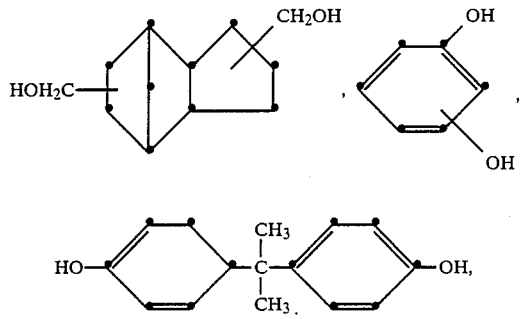

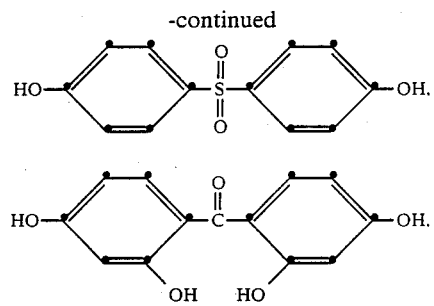

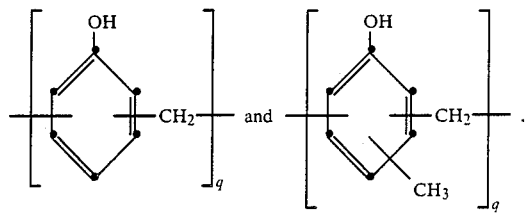

q being an integer from 3 to 20.

8. A compound of the formula I according to claim 1, wherein R¹, R² and R³ are hydrogen, a is 1, m is 2 and R⁴ is

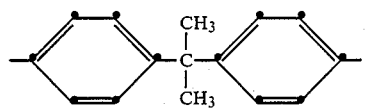

9. A compound of the formula I according to claim 1, wherein R¹, R² and R³ are hydrogen, a is 1, m is 2 and R⁴ is m-phenylene.

10. A compound of the formula 1 according to claim 1, wherein R¹, R² and R³ are hydrogen, a is 1, m is an integer from 2 to 20 and R⁴ is an m-valent radical of a cresol novolak after removal of m hydroxyl groups.

* * * * *